United States Patent
De Lamberterie et al.

(10) Patent No.: US 10,527,246 B2
(45) Date of Patent: Jan. 7, 2020

(54) DEVICE FOR PROJECTING A PIXELIZED LIGHT BEAM, HEADLAMP EQUIPPED WITH SUCH A DEVICE

(71) Applicant: VALEO VISION, Bobigny (FR)

(72) Inventors: Antoine De Lamberterie, Bobigny (FR); Guillaume Thin, Bobigny (FR); Olivier-Sebastien Lesaffre, Bobigny (FR)

(73) Assignee: VALEO VISION, Bobigny (FR)

( * ) Notice: Subject to any disclaimer, the term of this patent is extended or adjusted under 35 U.S.C. 154(b) by 30 days.

(21) Appl. No.: 15/874,267

(22) Filed: Jan. 18, 2018

(65) Prior Publication Data

US 2018/0202624 A1  Jul. 19, 2018

(30) Foreign Application Priority Data

Jan. 19, 2017 (FR) ...................................... 17 50412

(51) Int. Cl.
*B60Q 3/00* (2017.01)
*F21S 41/153* (2018.01)
*G02B 27/22* (2018.01)
*F21S 41/25* (2018.01)

(52) U.S. Cl.
CPC .............. *F21S 41/153* (2018.01); *F21S 41/25* (2018.01); *G02B 27/2292* (2013.01)

(58) Field of Classification Search
CPC ...... F21S 31/153; F21S 31/663; F21S 31/285; F21S 31/265; F21S 31/143; F21S 31/25; G02B 19/0014; G02B 27/2202

USPC .......................................................... 362/538
See application file for complete search history.

(56) References Cited

U.S. PATENT DOCUMENTS

| 2015/0241009 | A1 | 8/2015 | Brendle |
| 2018/0149336 | A1* | 5/2018 | Tsai ................. F21V 5/007 |
| 2018/0202624 | A1* | 7/2018 | De Lamberterie ................ G02B 19/0066 |

FOREIGN PATENT DOCUMENTS

| DE | 10 2014 210 500 A1 | 12/2015 |
| EP | 2 357 399 A1 | 8/2011 |

OTHER PUBLICATIONS

French Preliminary Search Report dated Oct. 5, 2017 in French Application 17 50412 filed on Jan. 19, 2017 (with English Translation of Categories of Cited Documents).

* cited by examiner

*Primary Examiner* — Ali Alavi
(74) *Attorney, Agent, or Firm* — Oblon, McClelland, Maier & Neustadt, L.L.P.

(57) ABSTRACT

The invention relates to an optical device for projecting a pixelized light beam, in particular for a motor vehicle. The device comprises at least two matrix-arrays each equipped with primary light sources able to emit light rays and each placed in a plane that is specific thereto; at least one primary optical system associated with each matrix-array and placed downstream of the matrix-array, each primary optical system forming a virtual image of the matrix-array upstream of the latter; and an optical projecting system forming an image from the virtual images, in which image the virtual images overlap partially.

20 Claims, 8 Drawing Sheets

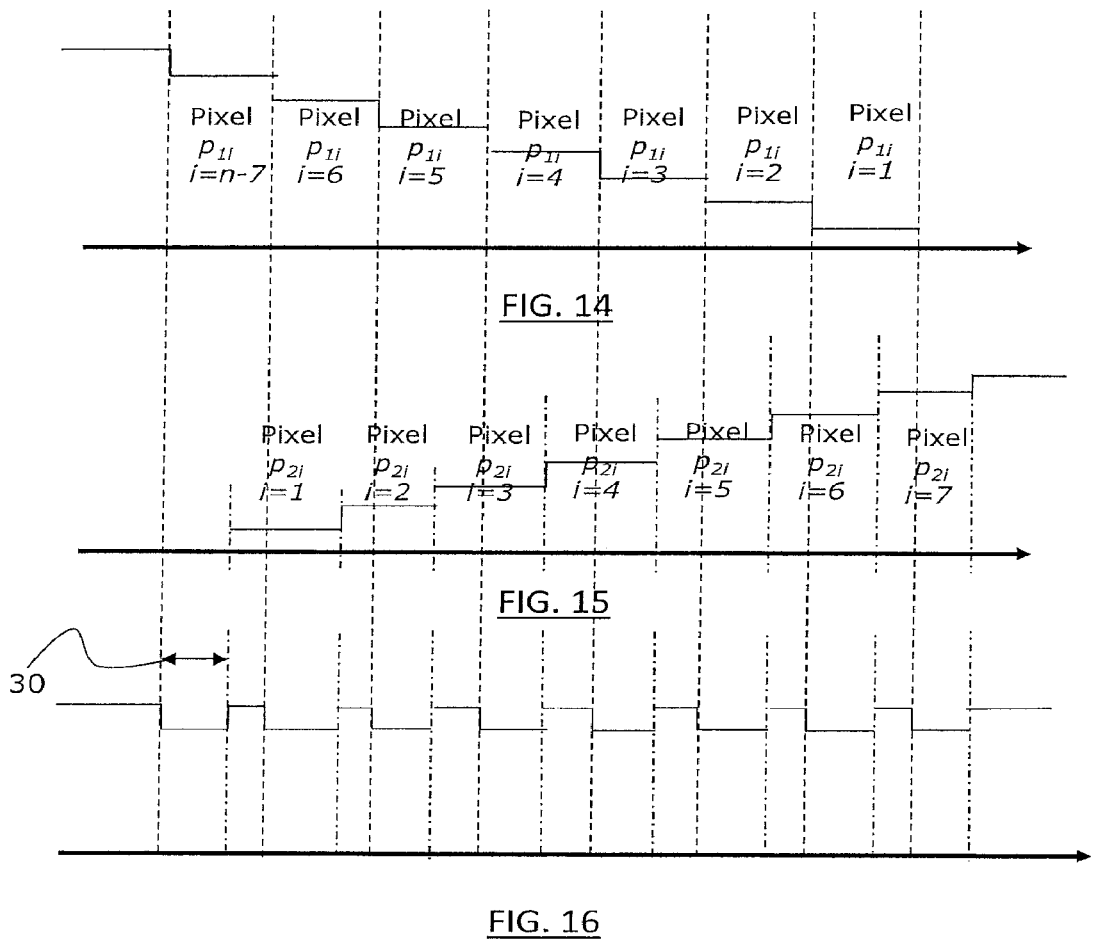
FIG. 14
FIG. 15
FIG. 16
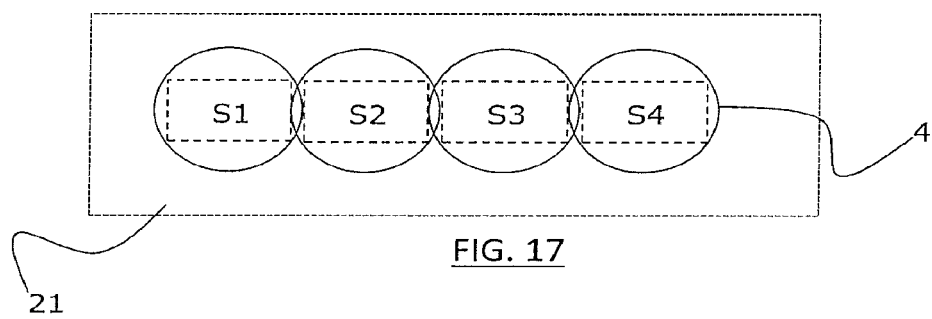
FIG. 17

DEVICE FOR PROJECTING A PIXELIZED LIGHT BEAM, HEADLAMP EQUIPPED WITH SUCH A DEVICE

FIELD OF THE INVENTION

The present invention relates to a light-beam-projecting device, in particular for a motor vehicle, and to a headlamp able to project a light beam, of the low-beam or high-beam type, and equipped with such a projecting device.

BACKGROUND

Motor-vehicle headlamps are equipped with one or more optical modules that are arranged in a housing closed by an outer lens so as to obtain, as output from the headlamp, one or more light beams. Simplifying, an optical module of the housing in particular comprises a light source, for example a (or more than one) light-emitting diode(s) (LED(s)) that emits (or emit) light rays, and an optical system including one or more lenses and, where appropriate, a reflector, in order to orient the light rays generated by the light source and form the light beam that is output from the optical module.

It is known that certain motor-vehicle headlamps are capable of making the orientation of the light beam vary depending on the needs of the driver of the vehicle. Thus, when the vehicle is cornering, an electronic system on board the vehicle commands a modification of the orientation of the light beam in order to match it to the field of vision of the driver during the manoeuvre. The headlamp then moves the axis of the light beam in the direction of rotation of the vehicle in order to illuminate the road rather than to project the beam straight ahead.

Other known headlamps are able to provide the low-beam and high-beam functions with the same light source. To this end, these headlamps use mechanical means that move an element, called a deflector, in order to cut off a portion of the beam. Furthermore, there is also a low-beam type light designed for motorway driving, the cut-off in the beam of which is slightly higher than that of a conventional low-beam light in order to improve the visibility of the road when the vehicle is being driven on a motorway.

Thus, it would be desirable to be able to control the light rays emitted by the source in order to modify the dimensions of the light beam that is output from the headlamp and to thereby provide all the aforementioned functions.

However, in present-day lighting systems, increased beam resolution is required, and hence the need in terms of number of pixels is great. Thus, the number of light sources, which may range from 1000 to 500000 or even higher, must be large in order to meet this need.

Now, diode matrix-arrays including such a number of sources have a plurality of disadvantages. The first disadvantage is the cost of manufacture of such assemblies, because a chip of large area has a much higher chance of being fabricated on a wafer element containing a defect. This leads to a low manufacturing yield and therefore to a high cost. A second disadvantage is the fragility of such a matrix-array, which means that particular care is required during handling thereof in order to prevent any damage.

In order to avoid this problem, a diode matrix-array meeting the aforementioned needs may be simulated by combining and assembling a plurality of diode matrix-arrays: the diode matrix-arrays are arranged end-to-end.

However, diode matrix-arrays arranged end-to-end do not allow a uniform light beam to be obtained because an interval also appears between the various light beams of the matrix-arrays composing the beam, which interval corresponds to the spacing between the matrix-arrays.

The invention therefore aims to obtain an optical device, in particular for a motor vehicle, that allows a uniform light beam to be projected from pixelized matrix-arrays of light sources that are arranged end-to-end.

SUMMARY OF THE INVENTION

To this end, the invention relates to a pixelized-light-beam-projecting optical device, in particular for a motor vehicle, that comprises at least two matrix-arrays each equipped with primary light sources able to emit light rays, and said at least two matrix-arrays are each placed in a plane that is specific thereto. The device comprises at least one primary optical system associated with each matrix-array and placed downstream of the matrix-array. Each primary optical system forms a virtual image of the matrix-array upstream of the latter. The device furthermore comprises an optical projecting system that is able to form an image from the virtual images formed upstream and in which image the virtual images imaged by the optical projecting system overlap partially in the image formed by the optical projecting system. The optical projecting system is therefore able to form an image of each virtual image, the images of the virtual images thus formed overlapping partially.

Thus, the invention allows matrix-arrays to be used and associated in order to create a light beam that is similar to the light beam that a large matrix-array of light sources would create. Thus there is no need to manufacture such matrix-arrays monolithically, thereby allowing production costs to be decreased and losses in case of damage to be lowered. In addition, the size of the set of matrix-arrays may easily be chosen since there is no need to juxtapose them and no need to manufacture a large matrix-array of suitable size each time.

Furthermore, since the virtual images are formed upstream of the matrix-arrays of light sources, they may be enlarged, thereby allowing the space between the luminous pixels produced by the sources of the various matrix-arrays to be minimized.

In addition, the optical projecting system outputs an image based on virtual images formed upstream of the matrix-arrays, in which image images of the virtual images overlap partially, thus achieving a good uniformity for the light distribution between the matrix-arrays.

Moreover, the matrix-arrays that include the primary sources are placed in different planes, thereby allowing the efficiency of the optical system to be optimized even for primary light sources that are located at the edge of the optical device. Each optical system of a matrix-array deals with a smaller field than if a blanket optical system were associated with all of the matrix-arrays. Thus, the optical device according to the invention produces fewer aberrations and the transmission of the light produced by the matrix-arrays is improved.

In addition, the device according to the invention is very easy to implement and to configure because each matrix-array/optical system may be corrected, managed and designed individually, contrary to a single optical system.

It is also worth mentioning that the device according to the invention allows optics (for example lenses) that are thinner than that or those that a single optical system would require to be used. Thus, the total weight of the optics of the device according to the invention is lower than that of a single optical system. The use of the device according to the invention in a land-vehicle headlamp allows fuel to be saved.

The focus of the projecting means on the virtual images makes the optical projecting module insensitive to manufacturing defects in the primary optical systems: if the projecting means were focused on the surface of the dioptric interfaces, it would be this surface that would be imaged and therefore any manufacturing defects therein would be visible—this could generate nonuniformities or chromatism in the projected light beam. In addition, this allows matrix-arrays of light sources to be used in association with the primary optical systems, each source and/or matrix-array of sources being imageable individually.

According to various examples of the invention, which will possibly be combined together or employed separately, the device may furthermore comprise:
- the matrix-arrays are associated into at least one pair of matrix-arrays and the images, formed by the projecting system, of the virtual images of a pair of matrix-arrays overlap partially;
- the matrix-arrays are associated so that a residual space is preserved between two successive contiguous matrix-arrays, this space being larger than the space between any two adjacent primary sources in a given matrix-array. In particular, the space between two successive contiguous matrix-arrays is strictly larger than the length of the electronic component forming each of the primary sources of these matrix-arrays;
- the primary light sources of a pair of associated matrix-arrays are configured so that the sum of the emittances at a point in the partial overlap is substantially equal to the emittance at a point in one of the matrix-arrays not contributing to the overlap;
- the configuration of the primary sources of each of the matrix-arrays of a pair of associated matrix-arrays comprises an increase in the emittance of the primary sources contributing to the partial overlap that is proportional to how far these primary sources of a first matrix-array of the pair are away from a second matrix-array of the pair;
- the associated matrix-arrays are pixelized light sources and p imaged pixels of each virtual image contribute to the partial overlap;
- an imaged pixel $p_{1i}$ of a first virtual image contributing to the partial overlap is associated with an imaged pixel $p_{2i}$ of a second virtual image contributing to the partial overlap, the pixels $p_{1i}$ and $p_{2i}$ forming a pair of imaged pixels, the light intensity produced for each pair of pixels of the partial overlap being substantially identical to that of the imaged pixels not contributing to the overlap;
- the imaged pixels $p_{1i}$ and $p_{2i}$ of a pair i of pixels overlap substantially in their entirety;
- an offset between the imaged pixels $p_{1i}$ and $p_{2i}$ of a pair of pixels is smaller than the length of a pixel of a matrix-array;
- the primary optical systems are arranged so that the virtual images of a pair of associated matrix-arrays overlap partially on a surface common to all of the formed virtual images;
- the surface common to all the formed virtual images is one from: a planar surface; a curved surface;
- the matrix-arrays are associated into at least one pair of matrix-arrays and the optical projecting system comprises means forming, for each of the virtual images, a second virtual image, the second virtual images of a pair of associated matrix-arrays overlapping partially in the image formed by the optical projecting system;
- the means of the optical projecting system forming a second virtual image for each of the virtual images comprise a prism associated with each primary optical system; p1 the primary light sources are light-emitting diodes.

The invention also relates to a motor-vehicle headlamp equipped with such an optical device.

BRIEF DESCRIPTION OF THE FIGURES

The invention will be better understood in light of the following description, which is given merely by way of indication and is not intended to limit the invention, and makes reference to the appended drawings:

FIGS. 14 to 16 schematically illustrate the modulation of the light intensity of substantially offset pixels contributing to the overlap;

FIG. 17 schematically illustrates a front view of a first example arrangement of matrix-arrays of light sources;

DETAILED DESCRIPTION

Figure 1:
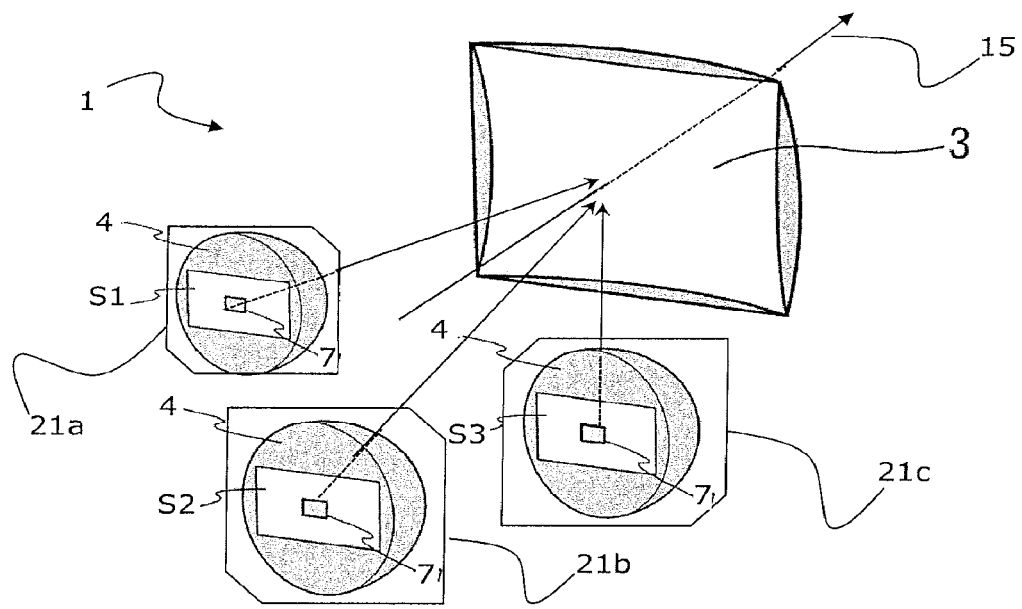
FIG. 1 schematically illustrates a perspective view of an example of a device according to the invention.

FIGS. 1, 8 to 10 show an example of an optical module 1 for projecting a light beam, in particular for a motor vehicle. The module 1 comprises, from upstream to downstream in the direction of propagation of the light rays along the optical axis 15, three matrix-arrays S1, S2, S3 comprising primary light sources 8 able to emit light rays, at least one primary optical system 4 associated with each matrix-array that transmits the light rays emitted by the primary light sources of the matrix-array with which it is associated, and optical projecting means 3 configured to project a light beam from the incident light rays transmitted by the primary optical systems 4. The optical module comprises, in these examples, three matrix-arrays of primary light sources, it being understood that the minimum number of matrix-arrays is at least two matrix-arrays.

Again in FIGS. 1, 8 to 10, the direction of propagation of the light rays emitted by the matrix-arrays of primary sources is represented by the arrows that start from the matrix-arrays S1, S2, S3 and are directed towards the projecting means 3. The expression primary optical system 4 placed downstream of the matrix-array means that the primary optical system is located on the path taken by the light emitted by the primary sources.

The projecting means 3 form an optical projecting system and may take the form of a single projecting lens. The projecting means could nevertheless be formed from the association of a plurality of lenses, of a plurality of reflectors, or even of a combination of one or more lenses and/or of one or more reflectors.

Figure 8:
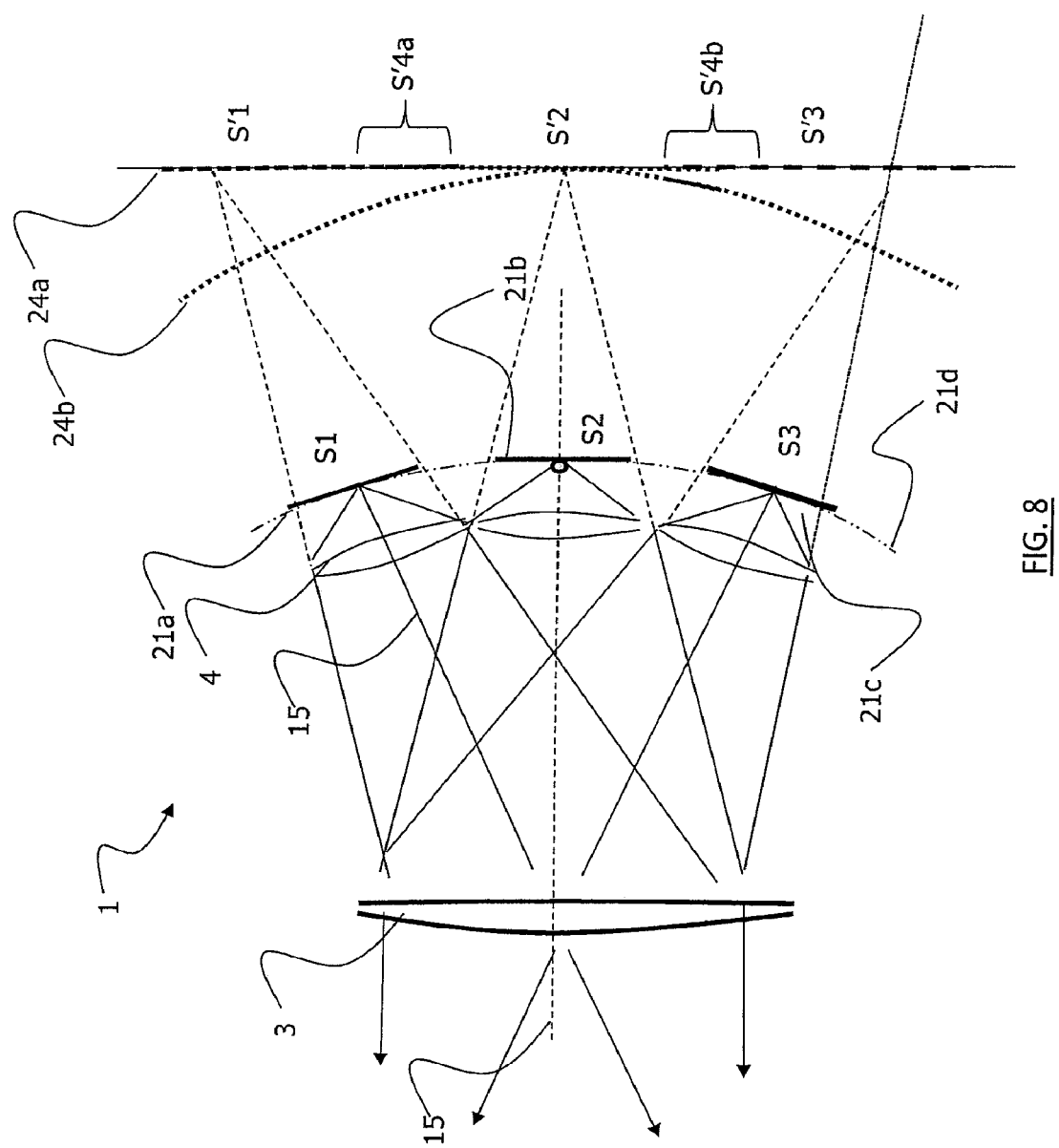
FIG. 8 schematically illustrates a top view of a first example of a device according to the invention.

Each matrix-array S1, S2, S3 is placed in a plane that is specific thereto: the matrix-array S1 is placed in the plane 21a, S2 in the plane 21b and S3 in the plane 21c. The way in which the planes are placed with respect to one another may vary. In a first example, the planes of the matrix-arrays are coincident. In another example, the planes of the matrix-arrays are substantially parallel to one another. In another example, the planes of the matrix-arrays are placed in order to allow the centre of each matrix-array to be able to be placed on a curved line; preferably, the curved line rests on a plane that comprises the optical axis of the projecting means, and it may be regular, for example a circular arc 21d as illustrated in FIG. 8. Thus, in the latter example, the matrix-arrays are placed in space so that their respective centres rest on a circular arc with a radius that may be comprised between infinity (i.e. a planar surface) and f/5, where f is the value of the focal length of the overall system formed by the combination of one of the primary optical systems and of the optical projecting system. Each matrix-array therefore belongs to a plane that is specific thereto. It will be understood that the arrangement of the planes in space is not limited to the preceding examples; the only limit is that the primary optical system associated with each matrix-array be able to form a virtual image of the matrix-array upstream of the latter. The creation of the virtual images is discussed below.

The function of the primary optical system 4 associated with each matrix-array is to transmit the light rays of the primary light sources of the matrix-array so that, combined with the projecting means, the beam projected from the module, for example onto the road, is uniform.

To this end, the primary optical system 4 may be equipped with one or more convergent optics. In FIG. 8, the primary optical systems 4 are single convergent lenses.

Figure 2:
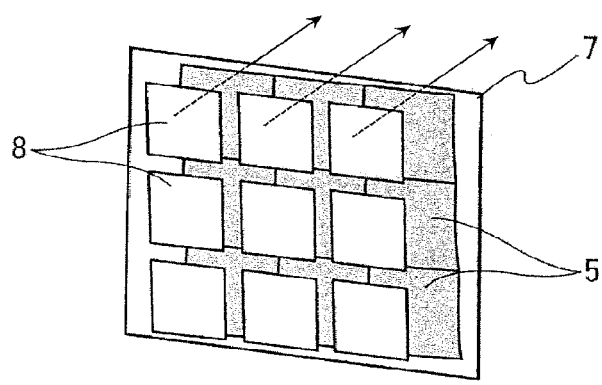
FIG. 2 schematically illustrates an enlarged perspective view of a portion of the device in FIG. 1.

In the example illustrated in FIG. 2, said one or more convergent optics may be convergent entrance micro dioptric interfaces 5. Here, the entrance micro dioptric interfaces 5 have a convex surface, i.e. they are curved towards the exterior, in the direction of the sources 8. This surface could however be planar, planar-convex or concave-convex. One entrance micro dioptric interface 5 is advantageously placed downstream of each light source 8, i.e. of each light-emitting diode or diode matrix-array of the matrix-array 2, as shown in FIG. 2. The entrance micro dioptric interfaces 5 form virtual images 6 of the primary light sources 8, as is shown in FIG. 2.

The term micro dioptric interface designates dioptric interfaces the outside dimensions of which are smaller than or equal to 5 times the dimensions of the primary light source or of the associated matrix-array of primary light sources. They are in general of the order of a millimetre. Thus for example, for an individual light-emitting diode (LED) the emitting area of which is of 1 mm side length, the dimensions of the associated dioptric interface will be inscribed in a square of at most 5 mm side length. If the primary source consists of an LED matrix-array, it will be the dimensions of the matrix-array that will be considered. In addition, if the primary sources are all of the same size, provision will possibly be made for all the micro dioptric interfaces to be the same size. Advantageously however, provision will also possibly be made for the dioptric interfaces associated with the sources on the border of the matrix-array, in particular at the lateral ends, to be of larger dimensions than the others in order to form a laterally and vertically elongate virtual image that will produce a projected luminous pattern of larger size than the others, in particular in order to light the sides of the road.

The primary optical system 4 may furthermore comprise a single exit dioptric interface 9 for all the entrance micro dioptric interfaces 5. The exit dioptric interface 9 provides an optical correction of the beam transmitted to the projecting lens 3. This correction in particular serves to improve the optical efficacy of the device and to correct the optical aberrations of the system 4. To this end, the exit dioptric interface 9 has a substantially spherical dome shape. This shape deviates little the direction of the light rays of the beam originating from a source placed on the optical axis 15, and that pass through the exit dioptric interface 9. The exit dioptric interface 9 may have a substantially spherical dome shape, or indeed an elongate cylindrical shape with a bifocal definition.

The primary optical system 4 may be made of a single material, i.e. be integrally formed and made of the same material. In other words, the entrance micro dioptric interfaces 5 and the exit dioptric interface 9 form the entrance and exit faces of the same element, the primary optical system 4, which may be likened to be a complex lens.

The primary optical system 4 may comprise one exit micro dioptric interface 9 for each entrance micro dioptric interface 5. The primary optical system 4 then forms a set of bi-convex microlenses, each microlens being placed in front of a primary light source. However, such microlenses do not allow the overall transmitted beam to be corrected, unlike a primary optical system 4 equipped with a single exit dioptric interface 9. Such microlenses have the advantage of increasing the uniformity of the virtual images and of deforming the images less.

The exit dioptric interfaces 9 and the entrance micro dioptric interfaces 5 form part of a primary optical system 4 that is integrally formed and made of the same material. In other words, the primary optical system 4 comprises only a single element.

Thus, the primary optical system 4 equipped with micro dioptric interfaces as convergent optics allows a pixelized light source to be imaged in which each created virtual image is an imaged pixel. Below, and independently of the configurations of the primary optical systems, each matrix-array S1, S2, S3 will be considered to form a single virtual image. It will therefore be understood that the matrix-array may be a pixelized light source from which a virtual image is obtained, and this virtual image is composed of imaged pixels. Thus, all of the imaged pixels of the matrix-array form the virtual image. The imaged pixels on the edges of two neighbouring matrix-arrays partially overlap so that the virtual image of a matrix-array contains no spaces (zones without light). The primary optical system 4 of each matrix-array therefore allows a virtual image 6 of the primary light sources 8 to be formed in such a way as to obtain a uniformly distributed beam, i.e. the components of the light beam are correctly adjusted with respect to one another so that there are no dark strips and/or bright (higher intensity) strips therebetween that would decrease driver comfort.

The virtual images 6 are formed upstream of the matrix-arrays S1, S2, S3 of primary sources 8 by the primary optical systems 4. The expression "a virtual image of the matrix-array is formed upstream of the latter" means that the rays formed upstream of each primary optical system seem to originate from an image located behind each primary source. The virtual images therefore serve as new light sources for the projecting means.

The virtual images 6 obtained are preferably enlarged, and the virtual images of a pair of associated matrix-arrays (20) overlap partially. A pair of associated matrix-arrays means two contiguous matrix-arrays, their contiguity being established with respect to a zone of spacing between the two matrix-arrays. In other words, a pair of associated matrix-arrays means two matrix-arrays that it is desired to see, or that may be considered to be, end-to-end. Arranging two matrix-arrays end-to-end therefore corresponds to placing them side-by-side, preferably as close as possible, with the aim for example of simulating a monolithic matrix-array. However, a residual space is preserved between two successive contiguous matrix-arrays, this space being larger than the space between any two adjacent primary sources 8 in a given matrix-array. In particular, the space between two successive contiguous matrix-arrays is strictly larger than the length of the electronic component forming each of the primary sources 8 of these matrix-arrays.

Thus, the contiguous virtual images of two contiguous matrix-arrays overlap partially: the partial overlap results in an overlay of their respective projections by the projecting means. More precisely, one or more images of the primary sources of two end-to-end matrix-arrays overlap. Overlap of imaged pixels may then be spoken of. In fact, it will be sought in the design of the primary optical systems, in the arrangement of the primary optical systems with respect to one another, and in the arrangement of the primary optical systems with their respective matrix-arrays, to make it so that the virtual images partially overlap from a paraxial point of view, with a margin of tolerance in order to ensure robustness with respect to the precision with which the light sources can be positioned and with respect to defects in the manufacture of the primary optical systems (for example in the surfaces of the micro dioptric interfaces). The invention therefore not only allows standard components that are available on the market to be used, but it also avoids problems with thermal expansion between the end-to-end components that bear the light sources. The overlap ensures robustness of the system with respect to tolerances in virtual-image position, the tolerance in virtual-image position itself depending on tolerance in the position of the primary sources and on tolerance in the position and manufacture of the primary optical systems.

The virtual images 6 may be further away from the projecting lens 3 than the matrix-arrays of the primary light sources, thereby allowing a compact optical module to be retained.

The primary optical systems 4 are advantageously configured to form virtual images 6 on a single surface that is common to all the virtual images formed by the various primary optical systems. Thus, said single surface serves to create a virtual image formed from all the virtual images, and this virtual image is continuous in particular because the virtual images of pairs of associated matrix-arrays overlap partially. In other words, the contiguous virtual images overlap partially and create a single virtual image in which there is no non-illuminated zone. In other words, there are no dark zones in the light beam emitted by the module according to the invention.

Preferably, the dimensions of the virtual images 6 are larger than the dimensions of the primary light sources 8. As FIG. 8 shows, the enlargement of the size of the virtual images S'1, S'2 and S'3 allows a partial overlap of the virtual images of a pair of associated matrix-arrays. For example, the matrix-arrays S1 and S2 form a pair of associated matrix-arrays because they are contiguous. Their respective primary optical system (in this example a single convergent lens) creates a virtual image, S'1 and S'2, respectively. The two virtual images S'1 and S'2 are formed on the same surface 24*a*, 24*b*. The overlap is located level with the curly bracket S'4*a*. Similarly, the matrix-arrays S2 and S3 form a pair of associated matrix-arrays because they are contiguous, and their virtual images S'2 and S'3 are also formed on the plane 24*a* with an overlap located level with the curly bracket S'4*a*. The single surface may be a plane 24*a*. It may also be a surface having a curvature; for example the surface 24*b* has a curvature such that any point on the surface has a tangent plane. A curved surface allows aberrations created by the projecting means, which may be formed by the optical projecting lens 3, to be corrected. In any case, the virtual image formed from all the virtual images is continuous, i.e. it contains no dark zones.

In order to obtain the overlap between the contiguous virtual images, i.e. between the virtual images of a pair of associated matrix-arrays, the convex curvature and the material from which each primary optical system is made are tailored to the dimensions of the matrix-array S1, S2, S3 of primary sources 8, and likewise the position of the primary optical system 4 with respect to the matrix-array, so that the contiguous virtual images overlap partially. In order to minimize aberrations, it is possible to place the primary optical system almost in contact with the matrix-array with which it is associated. Typically, the distance between the primary optical system and the associated matrix-array is smaller than 1 mm, 0.5 mm for example.

FIGS. 3 and 5 to 7 show examples of matrix-arrays that the device according to the invention may comprise. A matrix-array comprises at least two different light-emitting zones that are individually addressable; a matrix-array therefore comprises at least two primary light sources (8) that are able to emit light rays. The primary sources preferably form a grid of primary sources, i.e. the light sources are distributed over the matrix-array in a regular pattern, for example a chequerboard pattern.

Figure 3:
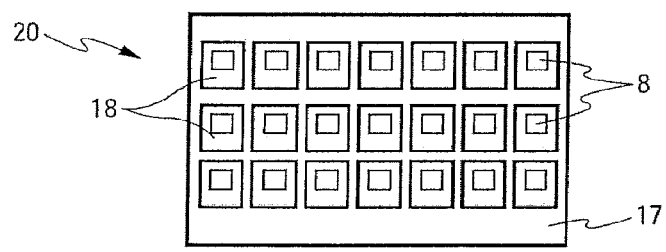
FIG. 3 schematically illustrates a front view of a first type of matrix-array of light sources.
Figure 4:
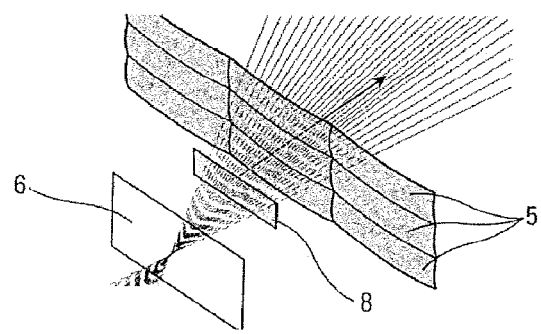
FIG. 4 schematically illustrates a side view of the first embodiment of a device according to the invention.

FIG. 3 shows a multi-chip matrix-array 20 of light sources 8, of light-emitting-diode type, each source 8 being individually addressable. Each source 8 is manufactured separately on an independent chip, which is mounted on a holding element 18, itself assembled with the other sources on a carrier 17.

Figure 5:
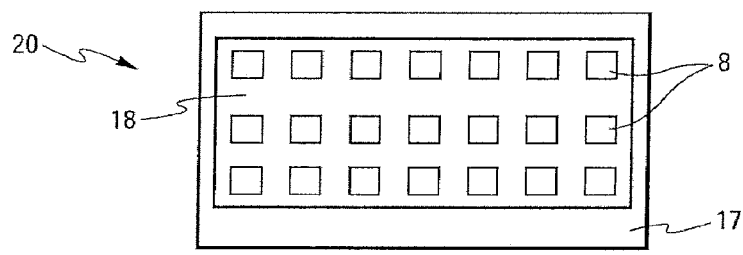
FIG. 5 schematically illustrates a front view of a second type of matrix-array of light sources.

FIG. 5 shows a second type of multi-chip matrix-array 20 in which the light-emitting diodes are preassembled with one another on a common holding element 18 placed on a carrier 17.

Figure 6:
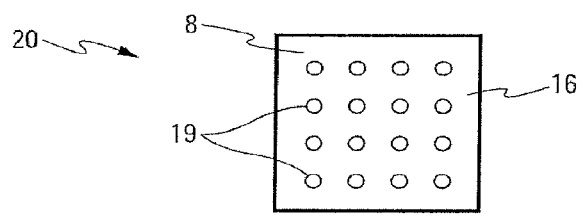
FIG. 6 schematically illustrates a front view of a third type of matrix-array of light sources.
Figure 7:
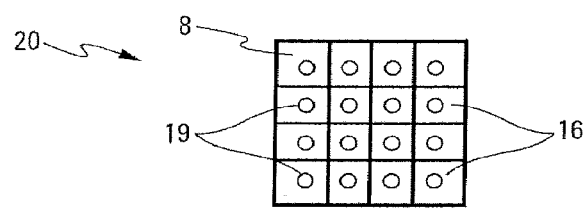
FIG. 7 schematically illustrates a front view of a fourth type of matrix-array of light sources.

FIGS. 6 and 7 illustrate single-chip matrix-arrays 20, in which the light sources 8 have an electrode in common. A diode has two contact electrodes 16, 19, a discrete first electrode 19 and an areal second electrode 16. In FIG. 6, the primary sources 8 are individually addressable by activating the first electrode 19, the second electrode being the same for all the sources 8 of the chip. In contrast, the light sources 8 of FIG. 7 have a second electrode 19 divided into sections so as to obtain an independent second electrode 19 for each source 8, the first electrodes 16 being activatable simultaneously.

The matrix-arrays may be based on a semiconductor light source comprising a plurality of electroluminescent units of submillimetre dimensions, the units being distributed between various selectively activatable light-emitting zones. In particular, each of the electroluminescent light-emitting units of submillimetre dimensions takes the form of a rod.

The primary light sources 8 are for example light-emitting diodes forming an array on a matrix, as for example shown in FIG. 5. Such matrix-arrays of light-emitting diodes are known and commercially available.

The primary optical systems 4 associate the light rays of the matrix-arrays 20 in order to form a single beam having identical properties to those that it would have if the matrix-arrays of the device were perfectly end-to-end.

FIG. 17 shows a schematic example of a front view of four matrix-arrays (S1 to S4) that are end-to-end in a given plane 21, and in which the distance between two contiguous matrix-arrays (S1-S2, S2-S3, S3-S4) is nonzero, larger than 20 microns and typically from 1 mm to 20 mm or even more, because of constructional constraints related to the matrix-arrays. For the sake of clarity, in the figure the space between the end-to-end matrix-arrays is exaggeratedly large. Each matrix-array is associated with a primary optical system 4 (represented by a circle). It will be understood that the space between the contiguous matrix-arrays is exaggeratedly large in the figure for the sake of readability of the figure.

Figure 18:
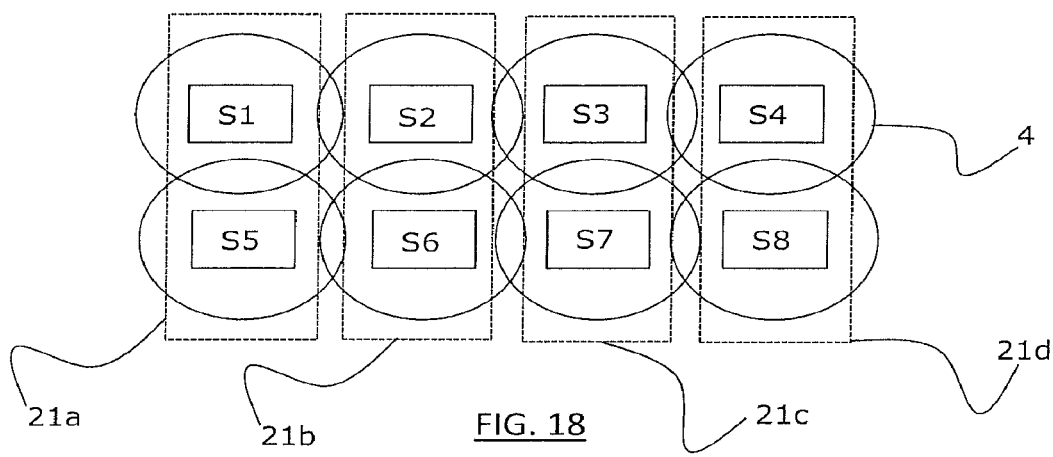
FIG. 18 schematically illustrates a front view of a second example arrangement of matrix-arrays of light sources.

FIG. 18 shows another schematic example of a device according to the invention, in which example each plane 21a to 21d comprises two matrix-arrays. In this example, the two associated matrix-arrays (S1-S5, S2-S6, S3-S7, S4-S8) are located in the same plane and are not end-to-end. Each matrix-array is associated with its primary optical system 4 (represented by a circle).

Figure 19:
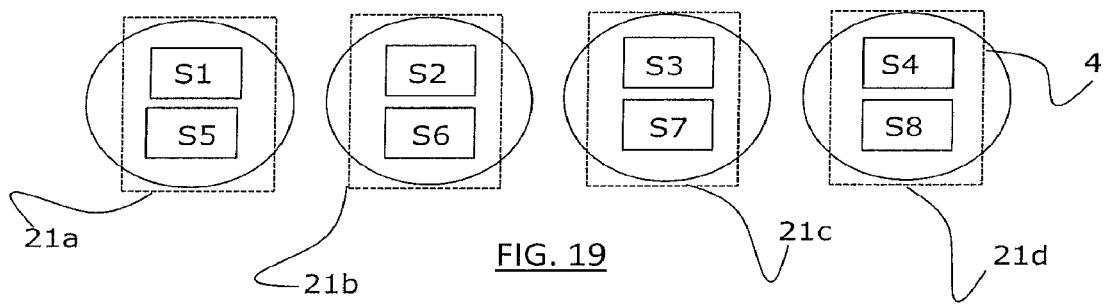
FIG. 19 schematically illustrates a front view of a third example arrangement of matrix-arrays of light sources.

FIG. 19 shows another schematic example of a device according to the invention, in which example each plane 21a to 21d comprises two matrix-arrays, the two matrix-arrays located in a given plane being end-to-end. The matrix-arrays placed in a given plane are associated with the same primary optical system, which they share, thereby allowing the weight of the device to be decreased.

In order for the beam exiting from the optical projecting lens 3 to be as uniform as possible (and in particular as regards contrast), the overlap between the contiguous virtual images may be managed or controlled. Managing the overlap means controlling one or more parameters of the overlap, for example its dimensions, its emittance, etc.

Figure 20:
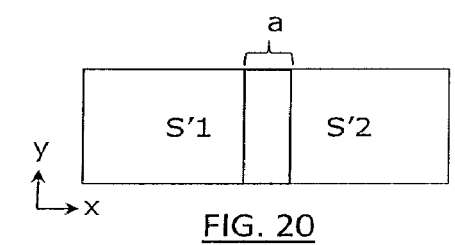
FIGS. 20 to 22 schematically illustrate examples of overlap.
Figure 21:
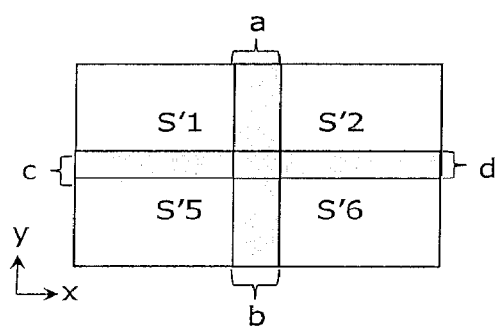

Regarding the dimensions of the zone of overlap, they will in particular depend on the light source and on the primary optical system that is associated therewith. The matrix-arrays equipped with primary light sources may be of any shape. However, in practice the matrix-arrays are the shape of a quadrilateral, preferably a regular quadrilateral such as a rectangle or a square; thus the produced virtual image will also be a quadrilateral shape. The virtual images formed on the single surface partially overlap from a paraxial point of view. More precisely, the overlap is created, for each association of two matrix-arrays, in at least one direction, and the width of the overlap is the measured distance of the overlap in the same direction. FIG. 20 shows an example of overlap of two virtual images S'1 and S'2 produced for example by the sources S1 and S2 of FIGS. 1, 8, 17-19. The two images are of rectangular shapes because the matrix-arrays of the light sources S1 and S2 are rectangular; for example their primary sources form a grid. The two virtual images S'1 and S'2 are aligned in a first direction y, and the overlap (the grey zone in FIG. 20) is created in the x direction for a width a. FIG. 21 shows another example of overlap of four virtual images S'1 and S'2 produced for example by the sources S1, S2, S5, S6 of FIG. 18. The four images are of rectangular shapes because the four matrix-arrays of the light sources are also. The two virtual images S'1 and S'2 (S'5 and S'6) are created by the pair of matrix-arrays S1 and S2 (S5 and S6) and are aligned in a first direction y, the overlap being created in the x direction for a given width a (b). It will be understood that the widths a and b are preferably equal in order to facilitate the management of the overlaps. S1 and S5 (S2 and S6) also form a pair of associated matrix-arrays, and their virtual images S'1 and S'5 (S'2 and S'6) are this time aligned in the x direction and overlap in the y direction for a width of overlap c (d). Likewise, the widths c and d are preferably equal in order to facilitate the management of the overlaps. A matrix-array may comprise more than one association; in this example, S1 is associated with two matrix-arrays S2 and S5.

Figure 22:
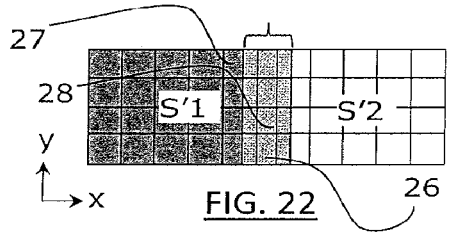

The associated matrix-arrays are pixelized light sources, this for example being the case with matrix-arrays of light-emitting diodes, or even the case with a light-emitting matrix-array associated with a primary optical system comprising entrance micro dioptric interfaces 5. Therefore, when the light sources are pixelized sources, the pixels of these sources are imaged and all of the imaged pixels form the virtual image of the matrix-array. In this context, p imaged pixels of each virtual image contribute to the partial overlap; p is a natural integer. Each pixel among the p pixels may contribute in its entirety or indeed partially to the overlap. FIG. 22 illustrates these two particular cases. FIG. 22 is similar to FIG. 20, except that the imaged pixels are shown. The pixel 26 of the virtual image S'2 contributes in its entirety to the overlap, whereas the pixel 27 of the virtual image S'1 contributes partially to the overlap.

In the example of FIG. 22, the two virtual images S'1 and S'2 have an equal number of imaged pixels, respectively $p_{1i}$ pixels for S'1 and $p_{2i}$ for S'2, that contribute to the overlap, the numbers $p_{1i}$ and $p_{2i}$ being natural integers. It is possible to envision examples in which the numbers $p_{1i}$ and $p_{2i}$ are not equal, for example if the density of pixels of the two virtual images is not equal.

There is an overlap provided that the contiguous virtual images contain a region of overlay that involves at least partially a pixel of each virtual image. In practice, the overlap is created, for each association of two matrix-arrays, in at least one direction; for example at least one column of imaged pixels of each virtual image participates in the overlap. Preferably, the width of the overlap involves at least two rows of imaged pixels of each virtual image in order to ensure that the overlap is resilient to factors such as thermal expansion that may occur between the components of the device and/or a loss of adjustment in the position of a matrix-array and/or its primary optical system. In FIG. 22, two columns of pixels for each image S'1 and S'2 participate in the overlap.

The number of imaged pixels of each virtual image depends on the configuration of the matrix-array. For example, for a resolution of the imaged pixels comprised between 0.05° and 0.2°, the number of pixels p of a matrix-array that overlap with p pixels of another matrix-array is preferably higher than 10 pixels, i.e. 10 columns of pixels or more of each matrix-array overlap. Generally, it is possible to consider that an overlap comprised between 20 and 50 columns of pixels of each matrix-array ensures a very good robustness for the device.

The emittance of the overlap must be substantially equal to that of the zones of the vertical images not participating in the overlap. In other words, the primary light sources of a pair of associated matrix-arrays are configured so that the sum of the emittances at a point in the partial overlap is substantially equal to the emittance at a point in one of the matrix-arrays not contributing to the overlap. Here, the expression substantially equal means that the value of the emittance may vary by ±10% between the overlap and the other zones. Preferably, the variation is smaller than or equal to ±5%.

In practice, each matrix-array comprises a grid of primary light sources, as discussed with reference to FIGS. 3, 5-7, and each primary light source is individually addressable. It is therefore possible to modify the individual light intensity of an imaged pixel by modifying the emittance of one or more primary light sources of the matrix-array. For reasons relating to the manufacturing process, a matrix-array has the shape of a quadrilateral, preferably a regular quadrilateral such as a rectangle or a square. It is then possible to control the light intensity of the primary sources contributing to (or the root cause of) the illumination of a row of imaged pixels, said row of pixels contributing to the partial overlap. In order to facilitate the management of the control of the light intensity of the imaged pixels contributing to the overlap and to ensure the light intensity of the overlap is of uniform distribution, each imaged pixel $p_{1i}$ of a first virtual image contributing to the partial overlap is associated with one or more imaged pixels $p_{2i}$ of a second virtual image contributing to the partial overlap, so that the overlap comprises one or more pairs of pixels ($p_{1i}$, $p_{2i}$), the light intensities of the pairs of pixels ($p_{1i}$, $p_{2i}$) being substantially equal. The pairs are prioritarily chosen so that the imaged pixels composing them prioritarily overlap in their entirety. It will be understood that the light intensity of a pair of pixels ($p_{1i}$, $p_{2i}$) is the sum of the light intensity of each pixel of said pair.

In actual fact, this amounts to suitably controlling the average electrical current that passes through each primary source and that sets the average luminance of each pixel. For example, if the primary sources are LEDs, the duty cycle $T_{on}/T_{off}$ of the electrical current is controlled in order to obtain the desired average electrical current. This control is achieved as known in the art.

The light intensities of the pairs of pixels ($p_{1i}$, $p_{2i}$) are substantially equal. In order to improve the uniformity of the light intensity and to produce an intensity distribution that is constant over all of the virtual images, the primary light sources that contribute to the overlap—i.e. those that illuminate the imaged pixels of the overlap—may be configured such that their light intensity is proportional to how far away they are from the matrix-array to which they do not belong. For example, in FIG. 22, the light intensity of the imaged pixel 27 of S'1 is higher than that of the imaged pixel 28 of S'1.

Figure 11:
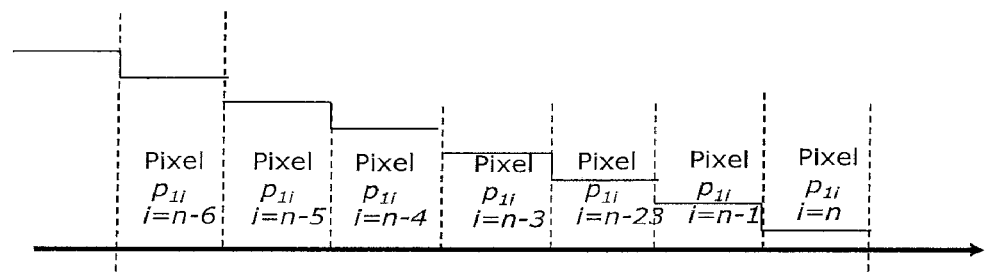
FIGS. 11 to 13 schematically illustrate the modulation of the light intensity of substantially superposed pixels contributing to the overlap.
Figure 12:
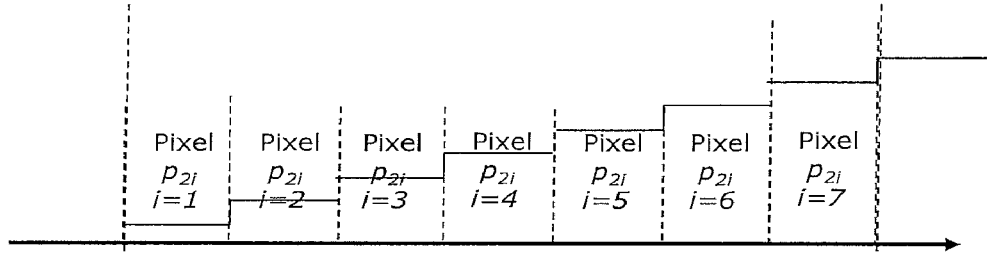
Figure 13:
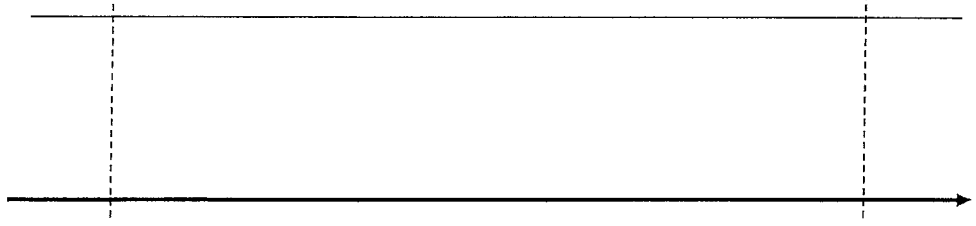

FIGS. 11 to 13 illustrate an example in which the matrix-arrays are identical so that it is possible to obtain a pair of imaged pixels—namely an imaged pixel $p_{1i}$ of a first virtual image contributing to the partial overlap and an imaged pixel $p_{2i}$ of a second virtual image contributing to the partial overlap—such that a total overlap of the two pixels is possible. FIG. 11 shows the intensities of six imaged pixels of a first virtual image, for example S'1 in FIG. 22. These pixels belong to the pixel columns numbered $p_{1i}$ with i comprised between n−6 and n, n being the number of columns of pixels of the matrix-array S1 producing the virtual image S'1. These pixels $p_{1i}$ are located in the same row of pixels of the virtual image S'1. FIG. 12 shows the intensities of six imaged pixels of a second virtual image, for example S'2 in FIG. 22. These pixels belong to pixel columns numbered $p_{2i}$ with i comprised between 1 and 7. These numbered pixels $p_{2i}$ are located in the same row of pixels of the virtual image S'2. The pixels of the first source S1—the matrix-array S1 is located to the left of the source S2 and produces the virtual image S'1—are controlled in order to obtain a decrease in emittance from one pixel column to the next whereas the pixels of the second source S2—the matrix-array S2 is located to the right of S1 and produces the virtual image S'2—have an emittance that increases from one pixel column to the next. The emittance difference between two consecutive columns may be dictated by the ratio i/p, with p representing the number of columns participating in the overlap for a virtual image and i representing the light intensity of the imaged pixels not contributing to the overlap. In FIG. 11, the intensity of the pixels contributing to the overlap decreases from high to low, and it increases from low to high in FIG. 12. By perfectly adjusting the overlap of each pair of imaged pixels contributing to the overlap, a constant intensity distribution is obtained in the two virtual images: the emittance of the overlap is equal to that of the other zones of the virtual images. FIG. 13 illustrates this constant intensity distribution in the two virtual images. It will be understood that the imaged pixels $p_{1i}$ and $p_{2i}$ of a pair of pixels overlap substantially in their entirety in the example of FIGS. 11 to 13. It will therefore be understood that the primary light sources of a pair of associated matrix-arrays are configured so that the sum of the emittances at a point in the partial overlap is substantially equal to the emittance at a point in one of the matrix-arrays not contributing to the overlap. Thus, the sum of the light intensity of each couple of overlapping imaged pixels ($p_{1i}$ and $p_{2i}$ in FIGS. 11 and 12) is substantially equal to the intensity of any one of the imaged pixels not participating in the overlap, taking as read that the two end-to-end matrix-arrays have, as regards their pixels not participating in the overlap, a similar emittance, i.e. an emittance that is very close or equal.

FIGS. 14 to 16 illustrate a particular case that is a little different from that illustrated in FIGS. 11 to 13 since the imaged pixels $p_{1i}$ and $p_{2i}$ of an association of matrix-arrays overlap only partially. A partial overlap may result from the device being incorrectly assembled during its manufacture (for example following a poor calibration), or even after its manufacture (for example following a shock). For example, the pixel $p_{1i=n-6}$ of the image S'1 of the first source S1 overlaps only partially with the pixel $p2_{i=1}$ of the image S'2 of the second source S2 (FIG. 15) with which it is associated and likewise for the pixel $p_{1i=n-5}$ and the pixel $p2_{i=2}$, and so on. Therefore, the intensity in the zone of overlap is not constant since there is an offset 30 between the images of the imaged pixels of each couple $p_{1i}$, $p_{2i}$ of a pair of pixels.

In the example of FIGS. 14 to 16, there is therefore a defect that is an intensity difference caused by the offset 30 that repeats regularly over the whole of the overlap. The amplitude of the defect is inversely proportional to the number of pixels that overlap. For example, seven pixels of each matrix-array are involved in the overlap, and the amplitude of the defect is i/7.

With a highly pixelized source (several hundred imaged pixels), it is thus possible to descend to a resolution of each imaged pixel that is comprised between 0.05° and 0.2°. For example, if the field onto which the matrix-arrays are projected is of 7° in the vertical direction and of 7° in the horizontal direction, then the number of pixels will be 20000 pixels for a resolution of 0.05° per pixel and 1000 pixels for a resolution of 0.2° per pixel. This resolution range for each imaged pixel corresponds to a spatial frequency comprised between 5 and 20 cycles per degree (cpd), and in this range of spatial frequency values, there is a defect contrast below which the defect will no longer be visible. For a spatial frequency of 5 cpd, the modulation must preferably be comprised between 1/50 and 1/20, inclusive of limits. Thus, the number of pixels of each matrix-array participating in the overlap must preferably be comprised between 20 and 50 pixels, inclusive of limits.

It is possible to make the defect invisible to the human eye by adjusting the way in which the associated pixels overlap. If the offset is smaller than 1 pixel, i.e. if there is at least a partial overlap between two associated pixels (as illustrated in FIGS. 14 to 16), the defect is then invisible to the human eye if the resolution of each associated imaged pixel is comprised between 0.05° and 0.2°. As explained above, the number of columns of pixels of each matrix-array participating in the overlap must preferably be comprised between 20 and 50 columns, inclusive of limits.

If the offset is larger than 1 pixel (for example, the pixel $p_{1i=n-5}$ that is associated with the pixel $p_{2i=2}$ overlaps only partially with the pixel $p_{2i=1}$), the defect may then be visible to the human eye. In this case, a correction may be made by modifying the light intensity of the imaged pixels of one and/or other matrix-array, or even by shifting the increase or decrease in light intensity of certain pixels if the size of the matrix-array in question is larger than the number of pixels able to be turned on; there are pixels in reserve in the matrix-array able to be used. In other words, it is possible to correct an offset larger than one pixel using the means for managing the pixels—i.e. by simply changing the pixels turned on. For example, if the pixel $p_{1i=n-5}$ partially overlaps with the pixel $p_{2i=1}$ only, it is possible to correct the defect by decreasing the width of the overlap, for example by increasing the intensity of the pixels $p_{1i}$ with i=n−6 to i=n by i/7 and the intensity of the pixel 7 of the second matrix-array by i/7. Another example of correction could be, if the matrix-array S2 contains primary sources able to serve to create an additional pixel column located on the left of the column containing the pixel 1, to shift the light intensity of the imaged pixels to the left, i.e. the pixel to the left of the pixel $p_{2i=1}$ would have the light intensity of the pixel $p_{2i=1}$, the pixel $p_{2i=1}$ would have the light intensity of the pixel $p_{2i=2}$, and so on.

Thus, an offset may either be ignored because it has no influence that is perceivable by the human eye, or else be corrected via a correction operation in which the light intensity of the pixels that participate in the overlap of the virtual images is reconfigured. This correction operation is easy to implement because it is essentially based on the control of the primary sources of the matrix-arrays, and does not require the position of the constituent elements of the device according to the invention to be modified. Thus, the device according to the invention allows incorrect assembly of the device to be corrected by reprogramming the pixels, i.e. without having to intervene physically on the elements comprised in the device.

Complementary to the example device according to the invention presented with reference to FIG. 8, two other example arrangements of the primary optical systems (4) and of the projecting system (3) will now be discussed.

Figure 9:
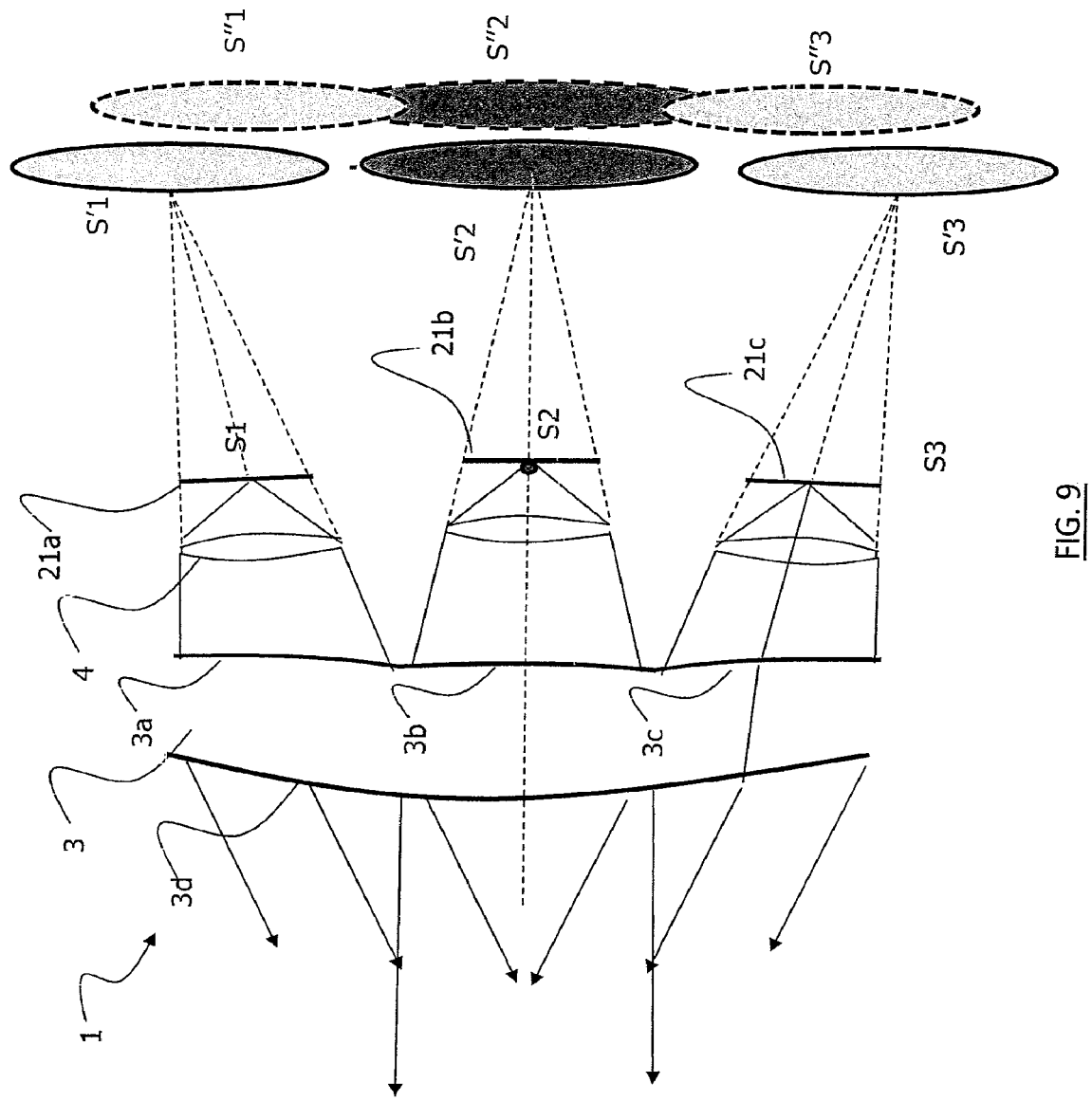
FIG. 9 schematically illustrates a top view of a second example of a device according to the invention.

FIG. 9 shows an example device that is similar to that discussed with reference to FIG. 8. It comprises three matrix-arrays S1, S2, S3 each equipped with primary light sources (8) that are able to emit light rays. Each matrix-array is placed in a plane 21a, 21b, 21c that is specific thereto. The planes 21a, 21b, 21c may be coincident, or not; in this example, they are not. Just as in FIG. 8, each matrix-array is associated with a primary optical system 4 that is placed downstream of the matrix-array. Each primary optical system forms a first virtual image S'1, S'2, S'3 of the source with which it is associated, and each of the virtual images is formed upstream of the matrix-array corresponding to the virtual image. Unlike the example in FIG. 8, the virtual images S'1, S'2, S'3 do not overlap partially. In the example of FIG. 8, the optical projecting system may be a conventional lens—for example an axisymmetric lens since the virtual images that are imaged already contain the overlap so that the projected beam will also have the overlap. In contrast, since the arrangement of the primary optical systems in FIG. 9 does not ensure the overlap, it is up to the optical projecting system (3) to ensure the overlap of the images of these sources at infinity. The optical projecting system comprises means forming, for each of the virtual images formed by a primary optical system 4, a second virtual image. Thus, as shown in FIG. 9, a second virtual image S"1 of the first virtual image S'1 of the matrix-array S1 is created, and likewise for each of the matrix-arrays S2 and S3. The second virtual images S"1, S"2, S"3 are formed so that they overlap partially in the image formed by the optical projecting system. The optical projecting system of FIG. 9 comprises means 3a, 3b, 3c that are each associated with one of the primary optical systems and that create the second virtual images S"1, S"2, S"3. These means 3a, 3b, 3c, which are located at the entrance of the optical projecting system 3, may comprise a prism that is associated with each matrix-array. Each prism contributes to bringing said first virtual images created by the primary optical systems back into phase. The optical projecting system of FIG. 9 furthermore comprises a lens 3d that forms the image of said second virtual images. The lens 3d may be a lens similar to that of the example of FIG. 8. The means 3a, 3b, 3c and the lens 3d may form one and only one lens, as depicted in FIG. 9. Alternatively, the means 3a, 3b, 3c and the lens 3d are separate and are then arranged so that the exit lens 3d of the projecting system can image at infinity said second virtual images. In another example, the means 3a, 3b, 3c are a lens and 3d is a lens. Or indeed, the means 3a, 3b, 3c are a dioptric interface, and 3d also. In this example, the overlap is created at the entrance of the optical projecting device.

Figure 10:
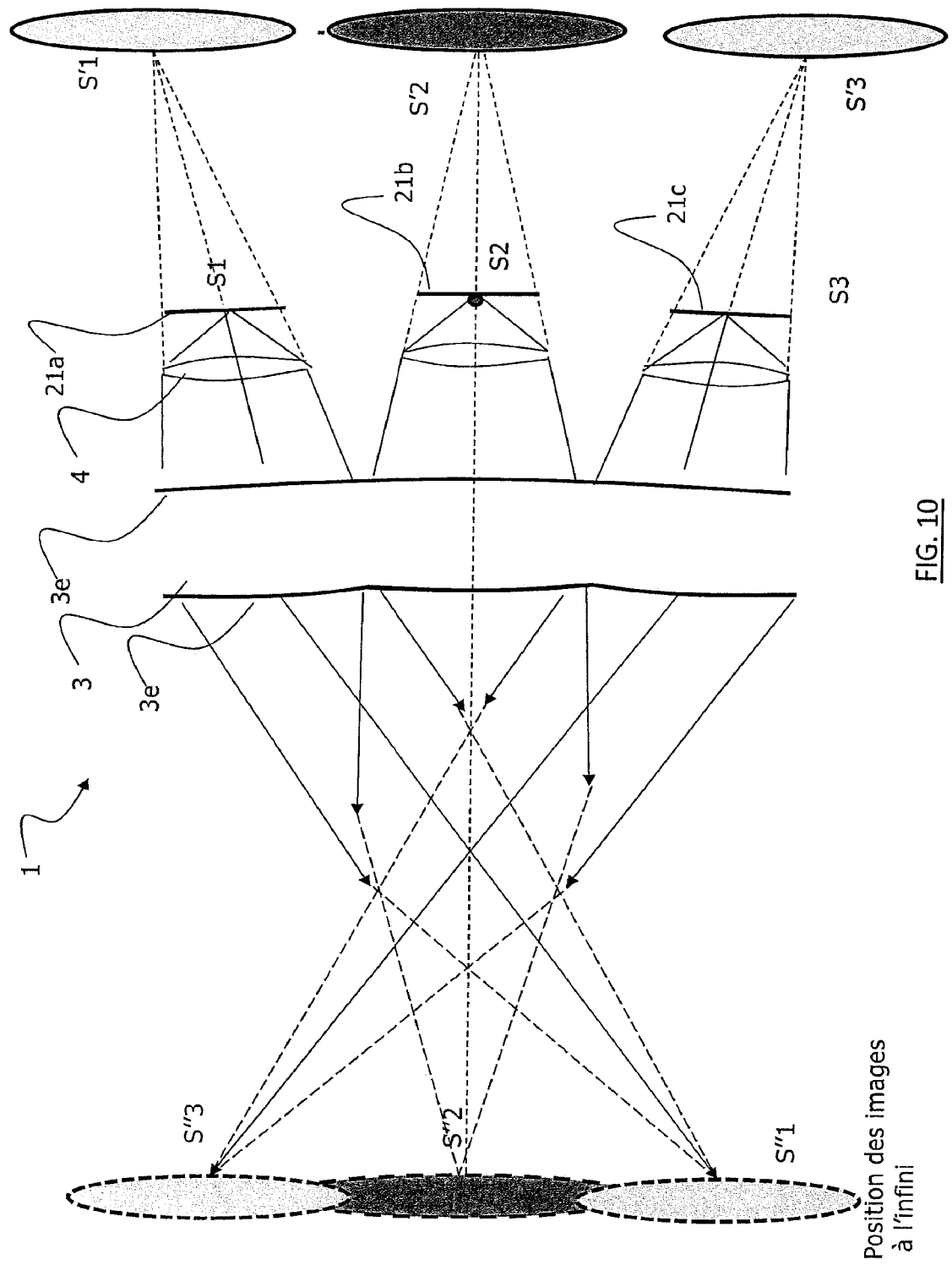
FIG. 10 schematically illustrates a top view of a third example of a device according to the invention.

FIG. 10 shows an example device that is similar to that discussed with reference to FIG. 9 in that the virtual images S'1, S'2, S'3 do not overlap partially. In the example of FIG. 10, the optical projecting system comprises two lenses 3e, 3f, which may be made of the same material and integrally formed. The two lenses 3e and 3f of the projecting system are arranged so that they create images S"1, S"2, S"3, corresponding to the virtual images S'1, S'2, S'3, that overlap partially. The overlap is therefore created at the exit of the optical projecting system.

The invention claimed is:

1. A pixelized-light-beam-projecting optical device, in particular for a motor-vehicle, comprising:
   at least two matrix-arrays each equipped with primary light sources configured to emit light rays and each matrix-array being configured as a pixelized light source;
   at least one primary optical system associated with each matrix-array and placed downstream of the matrix-array, each primary optical system including micro dioptric interfaces forming a virtual image corresponding to imaged pixels of the pixelized light source of the matrix-array disposed upstream of the respective primary optical system; and an optical projecting system configured to form an image of each virtual image, the images of the virtual images thus formed overlapping partially.

2. The device according to claim 1, wherein the matrix-arrays are associated into at least one pair of matrix-arrays and wherein the images of the virtual images of a pair of matrix-arrays formed by the projecting system overlap partially.

3. The device according to claim 2, wherein the primary light sources of a pair of associated matrix-arrays are configured so that a sum of emittances at a point in the partial overlap of the images of the virtual images is substantially equal to emittance at a point n one of the pair of associated matrix-arrays not contributing to the partial overlap of the images of the virtual images.

4. The device according to claim 3, wherein the configuration of the primary light sources of the pair of associated matrix-arrays comprises an increase in emittance of the primary light sources contributing to the partial overlap of the images of the virtual images that is proportional to how far the primary light sources of a first matrix-array of the pair are away from the primary light sources of a second matrix-array of the pair.

5. The device according to claim 2, wherein the associated matrix-arrays are pixelized light sources and p imaged pixels of each virtual image contribute to the partial overlap of the images of the virtual images.

6. The device according to claim 5, wherein an imaged pixel $p_{1i}$ of a first virtual image contributing to the partial overlap of the images of the virtual images is associated with an imaged pixel $p_{2i}$ of a second virtual image contributing to the partial overlap of the images of the virtual images, the pixels $p_{1i}$ and $p_{2i}$ forming a pair of imaged pixels, light intensity produced for each pair of imaged pixels of the partial overlap being substantially identical to light intensity of imaged pixels not contributing to the partial overlap.

7. The device according to claim 6, wherein the imaged pixels $p_{1i}$ and $p_{2i}$ of a pair i of pixels overlap substantially in their entirety.

8. The device according to claim 7, wherein an offset between the imaged pixels $p_{1i}$ and $p_{2i}$ of the pair of pixels is smaller than a length of a pixel of a matrix-array.

9. The device according to claim 2, wherein the primary optical systems are arranged so that the virtual images of the pair of associated matrix-arrays overlap partially on a surface common to all formed virtual images.

10. The device according to claim 9, wherein the surface common to all the formed virtual images is one from:

a planar surface; and a curved surface.

11. The device according to claim 1, wherein the matrix-arrays are associated into at least one pair of matrix-arrays and wherein the optical projecting system is configured to form, for each of the virtual images, a second virtual image, the second virtual images of the pair of associated matrix-arrays overlapping partially in the image formed by the optical projecting system.

12. The device according to claim 11, wherein the optical projecting system comprises a prism associated with each primary optical system, the prism configured to form the second virtual image for each of the virtual images.

13. The device according to claim 1, wherein the primary light sources are light-emitting diodes.

14. A motor-vehicle headlamp comprising the pixelized-light-beam-projecting optical device according to claim 1.

15. The device according to claim 3, wherein the associated matrix-arrays are pixelized light sources and p imaged pixels of each virtual image contribute to the partial overlap.

16. The device according to claim 3, wherein the primary optical systems are arranged so that the virtual images of the pair of associated matrix-arrays overlap partially on a surface common to all formed virtual images.

17. The device according to claim 2, wherein the primary light sources are light-emitting diodes.

18. A motor-vehicle headlamp comprising the pixelized-light-beam-projecting optical device according to claim 2.

19. The device according to claim 4, wherein the associated matrix-arrays are pixelized light sources and p imaged pixels of each virtual image contribute to the partial overlap.

20. The device according to claim 4, wherein the primary optical systems are arranged so that the virtual images of the pair of associated matrix-arrays overlap partially on a surface common to all formed virtual images.

* * * * *